(12) United States Patent
Hollman

(10) Patent No.: US 9,867,500 B1
(45) Date of Patent: Jan. 16, 2018

(54) CHARCOAL PILLOW PACK

(71) Applicant: Philip Alan Hollman, Lehigh Acres, FL (US)

(72) Inventor: Philip Alan Hollman, Lehigh Acres, FL (US)

( * ) Notice: Subject to any disclaimer, the term of this patent is extended or adjusted under 35 U.S.C. 154(b) by 0 days.

(21) Appl. No.: 15/225,858

(22) Filed: Aug. 2, 2016

(51) Int. Cl.
*A47J 37/07* (2006.01)
*C10L 5/36* (2006.01)

(52) U.S. Cl.
CPC ............. *A47J 37/079* (2013.01); *C10L 5/368* (2013.01); *C10L 2230/06* (2013.01)

(58) Field of Classification Search
CPC ........ C10L 5/368; C10L 2230/06; C10L 5/32; A47J 37/079
See application file for complete search history.

(56) References Cited

U.S. PATENT DOCUMENTS 2,948,594 A * 8/1960 Doyle ....................... C10L 5/32
229/406

* cited by examiner

*Primary Examiner* — Cephia D Toomer
(74) *Attorney, Agent, or Firm* — Ronald C. Capossela

(57) ABSTRACT

A pillow pack for charcoal briquettes comprises a plurality of briquettes arranged as a flexible flat planar array having a specific geometric shape and held together by a connecting material which is contact with each charcoal briquette and which may or may not be liquid fuel infused.

8 Claims, 1 Drawing Sheet

CHARCOAL PILLOW PACK

CROSS REFERENCE TO RELATED APPLICATIONS

This application claims priority from U.S. Provisional Application No. 62/282,507 filed on Aug. 4, 2015.

STATEMENT REGARDING FEDERALLY SPONSORED RESEARCH OR DEVELOPMENT

Not Applicable

NAMES OF PARTIES TO JOINT RESEARCH OR DEVELOPMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

SEQUENCE LISTING

Not Applicable

BACKGROUND OF THE INVENTION

Field of the Invention

The present invention relates to a unique package for configuring and placing charcoal briquettes below the cooking surface of an outdoor grill.

Background

Outdoor grilling of food is one of the favorite ways to cook meat, vegetables and many other foods whether in the backyard of one's home, on apartment balconies, on boats or in the park. Usually charcoal briquettes are purchased in large quantities, e.g. twenty pound bags. This creates a situation where one has to carry the bag of charcoal briquettes to the outdoor grill and pour them into the base of grill creating a lot of dirt and black dust as they are poured into the base of the grill and beneath the grilling surface. In addition the remainder of the bag of charcoal briquettes has to be stored and is of irregular dimensions so that the bag takes up a lot of room or may create un unstable base is something is stored on it.

Many packages have been suggested to resolve this briquette problem. For example, fuel packages which are broken and placed into the outdoor grill below the grilling surface have to be distributed by hand which can result in dirty hands and the possibility of dirt getting on the grilling surface. The present invention provides a unique package of charcoal briquettes that are arranged as a pillow and are placed in the bottom of the outdoor grill below the cooking surface without having to touch the charcoal briquettes, and due to the unique packaging, results in an even distribution of charcoal briquettes and therefore a better distribution of heat to the food being grilled.

SUMMARY OF THE INVENTION

This invention is concerned with a pillow pack composed of charcoal briquettes to be used as fuel in an outdoor grill.

The pillow pack of the present invention is prepackaged and able to be placed below the cooking surface of the outdoor grill in a manner which provides for even heating of the cooking surface.

The pillow pack of the present invention provides handles for the cook to place the pillow pack below the cooking surface without having to touch the charcoal briquettes with his/her hands and thereby keeping his/her hands clean.

The pillow pack of the present invention provides a means for securing the charcoal briquettes in a plurality of geometric shapes; e.g. rectangular, square, elliptical and semi-circular and combinations thereof.

The pillow pack of the present invention provides a means to secure the charcoal briquettes in pillow shaped form.

The pillow pack of the present invention provides charcoal briquettes which can be packaged with or without lighter fluid infused thereinto.

The pillow pack of the present invention is manufactured by placing a plurality of charcoal briquettes in a flexible flat planar array which are held together by a connecting material.

The pillow pack of the present invention includes stitched means for maintaining the integrity of the pillow form.

The pillow pack of the present invention provides a means for securing the briquettes in a manner which allows the pillow pack to be rolled into the shape of a log for indirect cooking.

The pillow pack of the present invention provides means for securing each charcoal briquette in the planar array in its own individual cell.

The pillow pack of the present invention contemplates a plurality of materials suitable for securing the charcoal briquettes in the proper geometric form and should not be restricted to any one material.

These and other aspects of the present invention will become more apparent to those having ordinary skill in the art after reading the following description of the preferred embodiments of the present invention, when considered in conjunction with the accompanying formal drawings wherein the same reference numerals are used consistently throughout the drawing figures. It should be understood that variations may be made in details and general features of the design without departing from the spirit and the scope the present invention.

DETAILED DESCRIPTION OF THE DRAWINGS

Figure 1:
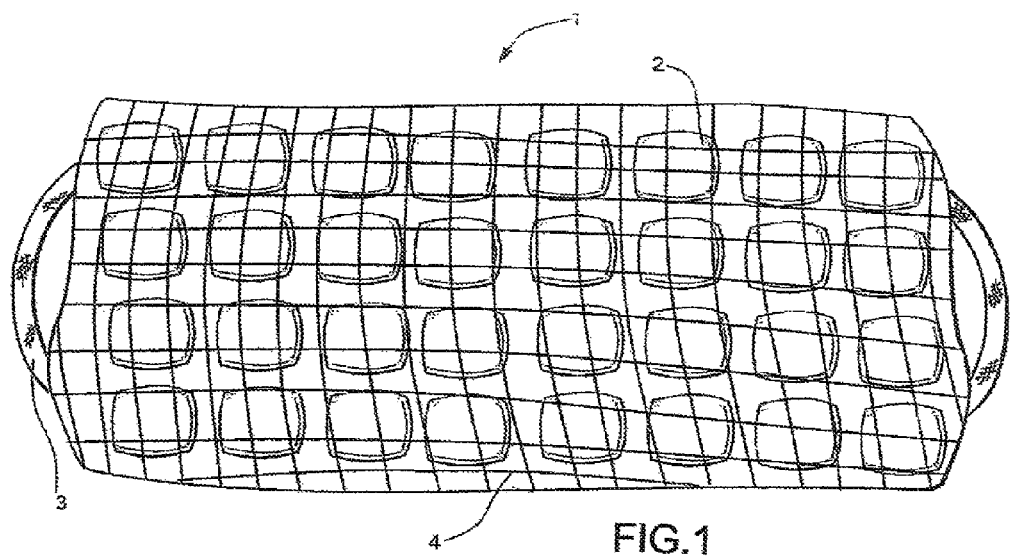
FIG. 1 is a perspective view of a first embodiment of the invention.

FIG. 1 shows the pillow pack 1 of the preferred embodiment of the present invention which includes a plurality of charcoal briquettes 2 laid out into a flexible flat planar array and in a particular geometric shape. The geometric shape can be a square, a circle, a triangle, circle, ellipse or any geometric shape which is capable of filling are of an outdoor grill below the cooking surface. It has been determined that a rectangle is optimum with the number of charcoal briquettes being used in a range of 4 by 8 for smaller grills and 6 by 9 for a larger grill. A connection material 4 is provided such that the connection material 4 is in contact with each individual charcoal briquette in the pillow pack 1. The connection material 4 can be comprised of any wicking material which is capable of providing a liquid fluid distribution path throughout the pillow pack 1 and a similar path for the flame for igniting the charcoal briquettes and distributing the heat evolved in a uniform manner throughout the charcoal grill. The connection material 4 has handles 3 positioned at either end thereof for providing the griller a means for lifting the pillow pack 1 from its package and placing it in the charcoal grill beneath the cooking surface. The connection material 4 is made up of a string-like support which includes a central wire covered by a fabric which can include any combination of materials that can provide the desired result as set forth above. I have found that the optimum ratio for the connection material 4 is a combination of up to 85% jute and up to 15% nylon.

Figure 2:
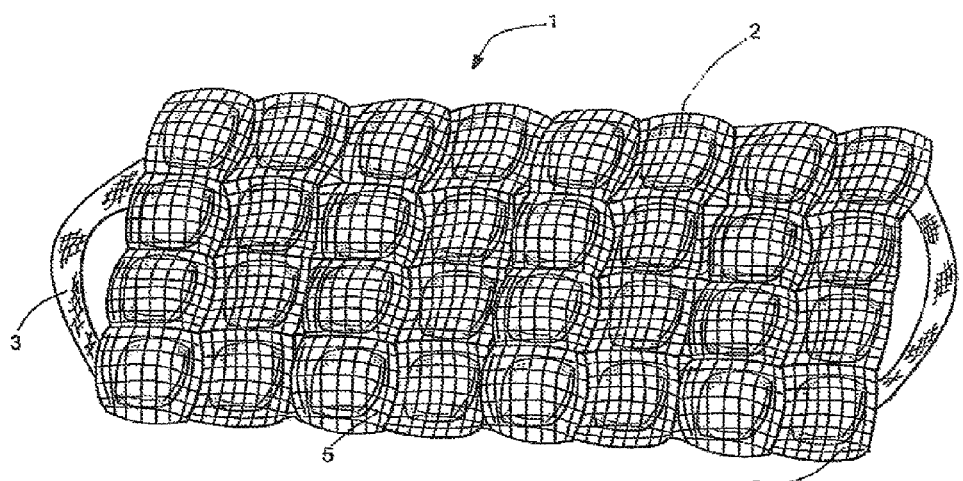
FIG. 2 is a perspective view of a second embodiment of the invention.

FIG. 2 illustrates a pillow pack 1 of another embodiment of the present invention wherein the pillow pack 1 comprises a plurality of charcoal briquettes laid out in a flexible flat planar array and in a particular geometric shape. A connection material 5 comprises an upper perforated mesh and a lower perforated mesh which are stitched together in an open weave manner which provides individual cells 6 for each charcoal briquette. The upper and lower perforated mesh are comprised of 21 inch caramel premier solid deco mesh ribbon which is sold in 24 feet spools with a ribbon width of 21 inches. The connection material 5 can be infused with a liquid fuel which would facilitate the wicking of the liquid fuel throughout the upper perforated mesh and the lower perforated mesh to insure an evenly distribution of the fluid and flame. The connection material 5 has handles 3 positioned at each end thereof for providing the griller a means for lifting the pillow pack 1 from its package and placing it in the charcoal grill beneath the cooking surface.

The invention claimed is:

1. A charcoal briquette pillow pack comprising: a plurality of charcoal briquettes arranged contiguously in a flexible flat planar array and a connection material in contact with each charcoal briquette in said flexible flat planar array such that said connection material maintains the charcoal briquettes in a rigid geometric shape and wherein the connection material is a flexible wire covered by a fabric material.

2. The charcoal briquette pillow pack as set forth in claim 1, wherein said fabric material comprises a string made of up to 85% jute and 15% nylon.

3. The charcoal briquette pillow pack as set forth in claim 2, wherein said rigid geometric shape is a rectangle.

4. The charcoal briquette pillow pack as set forth in claim 2, wherein said connection material is saturated with liquid fuel.

5. The charcoal briquette pillow pack as set forth in claim 2, wherein handles are provided at either end of said connection material for grasping the charcoal briquette pillow pack.

6. A charcoal briquette pillow pack comprising: a plurality of charcoal briquettes arranged contiguously in a flexible flat planar array and a connection material in contact with each charcoal briquette in said flexible flat planar array such that said connection material maintains the charcoal briquettes in a rigid geometric shape, wherein said connection material comprises an upper perforated open weave mesh and a lower perforated open weave mesh which are stitched together in such a manner that each charcoal briquette is encased into its own individual cell, and wherein handles are provided at both ends of said connection material for grasping the charcoal briquette pillow pack.

7. The charcoal briquette pillow pack as set forth in claim 6, wherein said connection material is saturated with liquid fuel.

8. The charcoal briquette pillow pack as set forth in claim 6, wherein the rigid geometric shape is a rectangle.

\* \* \* \* \*